United States Patent
Brown et al.

(10) Patent No.: US 10,684,666 B2
(45) Date of Patent: Jun. 16, 2020

(54) STARTUP ORCHESTRATION OF A CHASSIS SYSTEM

(71) Applicant: Dell Products L.P., Round Rock, TX (US)

(72) Inventors: Michael Emery Brown, Austin, TX (US); Jitendra Gul Jagasia, Round Rock, TX (US); Marshal F. Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 106 days.

(21) Appl. No.: 16/127,819

(22) Filed: Sep. 11, 2018

(65) Prior Publication Data

US 2020/0081511 A1   Mar. 12, 2020

(51) Int. Cl.

| | |
|---|---|
| *G06F 9/44* | (2018.01) |
| *G06F 1/28* | (2006.01) |
| *G06F 1/30* | (2006.01) |
| *G06F 11/30* | (2006.01) |
| *G06F 9/4401* | (2018.01) |
| *G06F 1/26* | (2006.01) |

(52) U.S. Cl.
CPC .............. *G06F 1/28* (2013.01); *G06F 1/263* (2013.01); *G06F 1/305* (2013.01); *G06F 9/4401* (2013.01); *G06F 11/3062* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 8,051,316 B2* | 11/2011 | Roberts | G06F 1/3203 713/300 |
| 10,291,554 B1* | 5/2019 | Ghosh | H04L 49/70 |
| 10,506,013 B1* | 12/2019 | Brown | H04L 65/602 |
| 2010/0106987 A1* | 4/2010 | Lambert | G06F 1/3203 713/320 |
| 2014/0052309 A1* | 2/2014 | Chandrasekhar | G06F 1/26 700/297 |
| 2015/0302199 A1* | 10/2015 | Page | G06F 21/554 713/1 |
| 2016/0275037 A1* | 9/2016 | Dube | G06F 13/4282 |

(Continued)

*Primary Examiner* — Zahid Choudhury
(74) *Attorney, Agent, or Firm* — Baker Botts L.L.P.

(57) ABSTRACT

Methods, systems, and computer programs encoded on computer storage medium, for identifying a power event of a chassis system; in response to identifying the power event, negotiating between a first and a second enclosure controller (EC) to place the one of the ECs in an active state, wherein the first and the second EC are redundant; in response to placing one of the ECs in the active state, performing, by a chassis orchestration engine, a sequence of actions, including: determining, by coordinating with a first daemon, whether a condition is present that would prevent safe activation of a power supply unit, activating, by coordinating with a second daemon, the power supply unit of the chassis system, activating, by coordinating with a third daemon, a cooling system of the chassis system after performing the sequence of actions, providing a signal to components indicating the active state of the first EC.

20 Claims, 4 Drawing Sheets

(56) References Cited

U.S. PATENT DOCUMENTS

2016/0378611 A1* 12/2016 Ljubuncic .......... G06F 11/1451
714/19
2017/0353383 A1* 12/2017 Hughes ................. H04L 45/38

\* cited by examiner

STARTUP ORCHESTRATION OF A CHASSIS SYSTEM

BACKGROUND

Field of the Disclosure

The disclosure relates generally to information handling systems, and, more particularly, to a system and method for startup orchestration of a chassis system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in methods that includes identifying a power event of a chassis system that includes a plurality of components; in response to identifying the power event, negotiating between a first and a second enclosure controller (EC) to place the one of the ECs in an active state, wherein the first and the second EC are redundant; in response to placing one of the ECs in the active state, performing, by a chassis orchestration engine, a sequence of actions, including: determining, by coordinating with a first daemon, whether a condition is present that would prevent safe activation of a power supply unit, activating, by coordinating with a second daemon, the power supply unit of the chassis system, activating, by coordinating with a third daemon, a cooling system of the chassis system, after performing the sequence of actions, providing a signal to the one or more of the components indicating the active state of the first EC.

Other embodiments of these aspects include corresponding system, apparatus, and computer programs, configured to perform the actions of the methods, encoded on computer storage devices.

These and other embodiments may each optionally include one or more of the following features. For instance, the sequence of actions further includes activating, by coordinating with an additional daemon, a network switch. The first daemon is a SLED daemon, the second daemon is a POWER daemon, and the third daemon is a THERMAL daemon. Determining, by the chassis orchestration engine, that there are battery backed memory modules present that are currently in-progress with a memory save operation; and in response to determining that a memory save operation is in progress, pausing chassis power operations until the save operation completes to avoid unsafe power conditions. After placing one of the ECs in the active state, providing power to the one or more components, including providing power to the chassis system, input/output modules (IOMs), and SLEDs. Conduction a power inventory of the one or more components of the chassis system. The power event is a cold boot or a warm boot.

Conducting the power inventory further comprises: after placing one of the ECs in the active state, providing a signal to each of a plurality of daemons each associated with one of the one or more computing components; receiving, in response to the signal and from each daemon, a current power usage associated with the respective computing component; and determining that power to be supplied by one or more power supply units of the chassis system is greater than an aggregated current power usage of the computing components.

After determining that the power to be supplied by the one or more power supply units of the chassis system is greater than the aggregated current power usage of the computing components, providing power to the one or more computing components. Identifying the power event of the chassis system is in response to a detected fail over process. Activating a clustering software component on the active EC to manage a failure recovery when failure occurs in the active EC. In response to the failure recovery, negotiating between the first and the second enclosure controller (EC) to place the other EC in a standby state, including releasing the other EC to join the active EC cluster only when each of the first and second ECs include identical firmware versions.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes methods, systems, and computer readable medium for startup orchestration of a chassis system. Specifically, a chassis orchestration engine performs startup and runtime orchestration of any actions that need to be performed that are to be coordinated among several daemons. Specifically, the chassis orchestration engine can orchestrate a specific sequence of actions of the different power components of the chassis system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Figure 1:
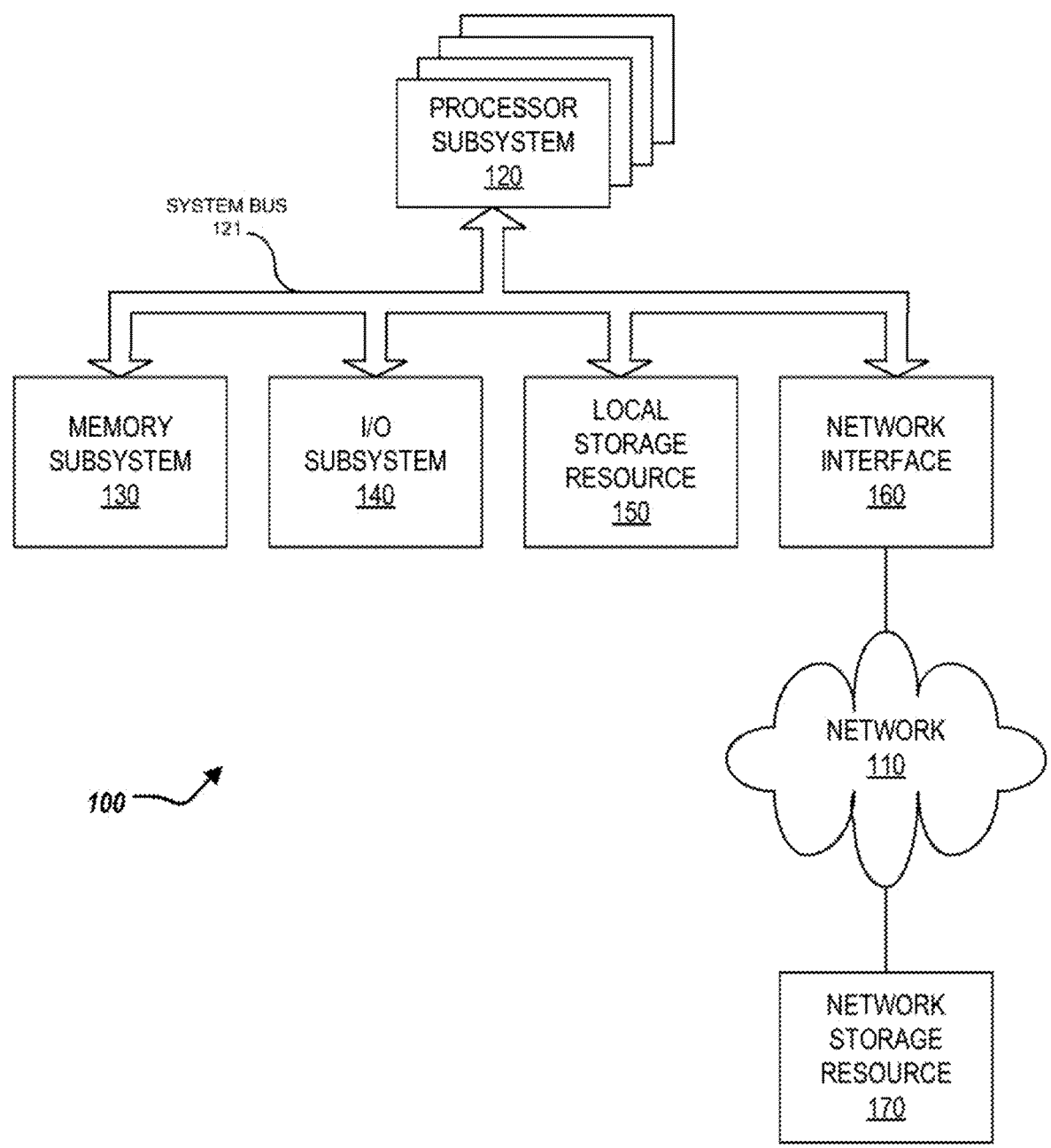
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
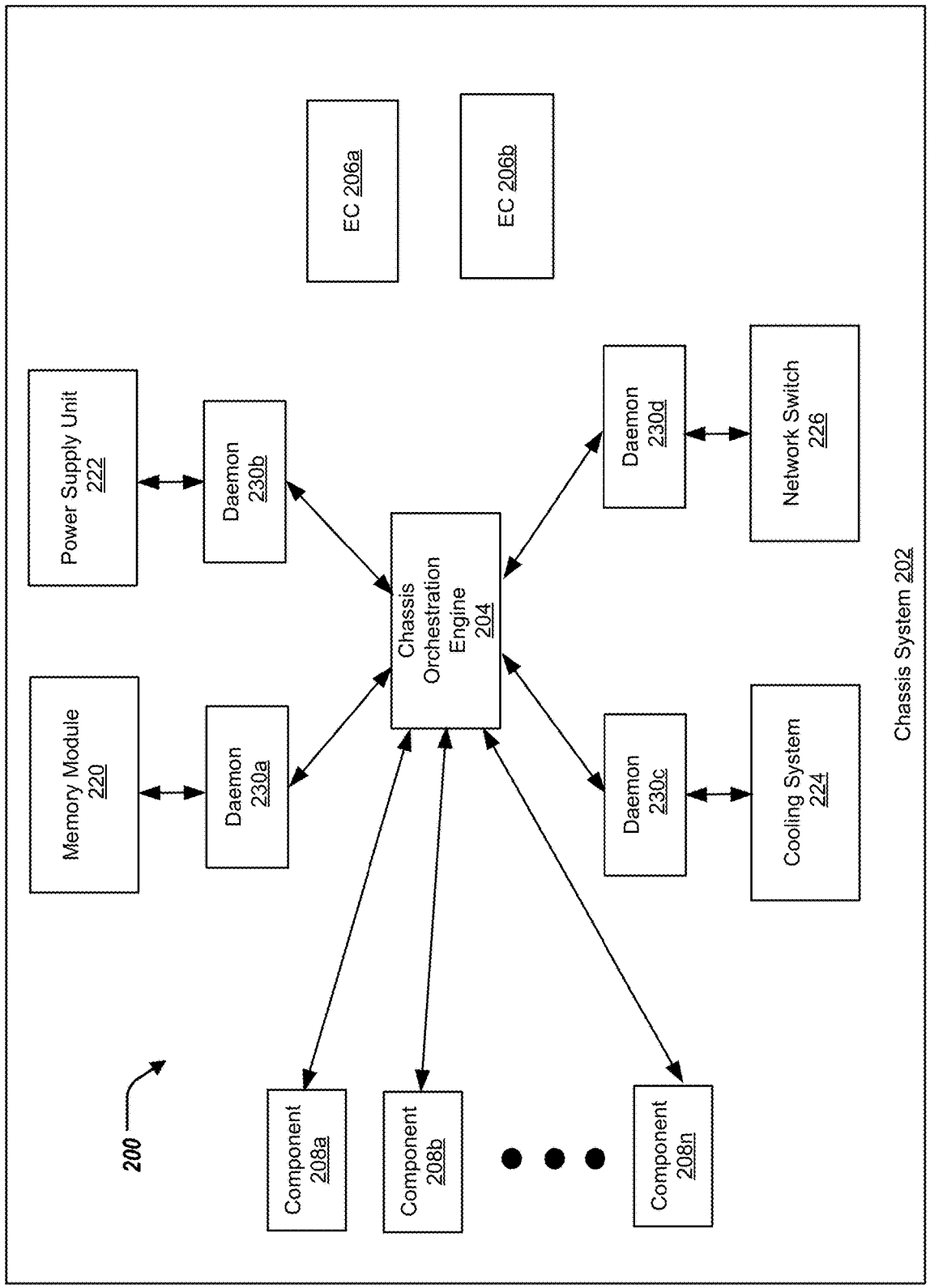
FIG. 2 illustrates a chassis system, including a chassis orchestration engine.

Turning now to FIG. 2, FIG. 2 depicts a chassis system 202. The chassis system 202 includes a chassis orchestration engine 204, a first enclosure controller 206a, a second enclosure controller 206b (collectively referred to as enclosure controllers 206), and computing components 208a, 208b, . . . , 208n (collectively referred to as computing components 208). The chassis system 202 can further include a memory module 220, a power supply unit (PSU) 222, a cooling system 224, and a network switch 226. In some examples, the enclosure controllers 206 are redundant of each other. The PSU 222 can include one or more power supply units. The chassis orchestration engine 204 can be included by the first enclosure controller 206a, the second enclosure controller 206b, or both. In some examples, a copy of the chassis orchestration engine 204 can be included by both the first enclosure controller 206a and the second enclosure controller 206b.

The enclosure controllers (EC) 206 provide low-level control of the memory module 220, the power supply unit (PSU) 222, the cooling system 224 (such as fans, thermal sensors), the network switch 226, as well as SLEDs, and input/output modules (IOMs). Broadly, the ECs 206 are in control of turning the power supply unit 222 on (or off) and providing (or facilitating) powering of the memory module 220, the cooling system 224, the network switch 226, and the computing components 208.

To that end, each of the memory module 220, the power supply unit 222, the cooling system 222, the network switch 226 and, in some examples, the components 208, are to be powered on (or off) in a specific sequence for the same to function as intended. For example, when power is supplied to the chassis system 202; when a user-provided request of powering up (or down) of the chassis system 202 is made; when the chassis system 202 experiences state changes (such as a SLED, IOM, or management module hotplug or removal); when a change in the health of the enclosure controllers 206, there can be a specific sequence of events/actions that are to occur for powering up (or down) the chassis system, described further herein.

The chassis system 202 can further include daemons 230a, 230b, 230c, 230d (collectively referred to as daemons 230); however, the chassis system 202 can include any number of daemons 230 corresponding to other components (e.g., components 208) of the chassis system 202. The chassis orchestration engine 204 can be in communication with the daemons 230. The daemons 230, in general, manage respective components of the chassis system 202. For example, the daemon 230a can manage the memory module 220; the daemon 230b can manage the PSU 222; the daemon 230c can manage the cooling system 224; and the daemon 230d can manage the network switch 226. In some examples, each daemon 230 is not aware of other components of the chassis system 202; and each daemon 230 is not aware of other daemons 230. In some examples, the chassis orchestration engine 204 is a daemon.

To coordinate the specific sequence of actions to power the chassis system 202, the chassis orchestration engine 204 can coordinate between the daemons 230. In short, the chassis orchestration engine 204 handles startup and runtime orchestration of any actions that need to be performed that are to be coordinated between the daemons 230. The chassis orchestration engine 204 orchestrates chassis startup actions from both cold boot and warm boot, shutdown actions, redundancy between the enclosure controllers 206, reset of the enclosure controllers 206, and handling fault recovery for various subsystems of the chassis system 202, such as a co-processer (not shown).

In some implementations, the chassis orchestration engine 204 can identify a power event of the chassis system 202. In some examples, the power event can include an initial booting of the chassis system 202. In some examples the power event can include a restart booting of the chassis system 202. In some examples, identifying the power event can include identifying a warm boot of the chassis system 202, or identifying a cold boot of the chassis system 202. In some examples, identifying the power event can be in response to a detected fail over process.

In some implementations, the chassis orchestration engine 204 can, in response to identifying the power event, negotiate between the enclosure controllers 206 to place the enclosure controller 206a in an active state. Specifically, a general-purpose input/output (GIPO) line exists between the enclosure controllers 206, with the enclosure controller 206a asserting prior to the enclosure controller 206b to place the enclosure controller 206a in the active state. In some examples, as a result of such, the enclosure controller 206b is placed in an inactive state.

In response to placing the enclosure controller 206a in the active state, the chassis orchestration engine 204 performs the sequence of actions to enable powering on of the chassis system 202. In short, in some examples, the chassis orchestration engine 204 checks a status of the memory module 220, enables the PSU 222, and enables the network switch 226. In some examples, the chassis orchestration engine 204 performs such in the specific order. In some examples, the chassis orchestration engine 204 checks whether a condition is present that would prevent safe activation of the PSU 222, enables the PSU 222, and activates the cooling system 224. In some examples, the chassis orchestration engine 204 performs such in the specific order. After completing the sequence of events, the remaining components 208 are able to be powered on.

Specifically, in some examples, the chassis orchestration engine 204 coordinates with the daemon 230a to determine that the memory module 220 is active. In particular, the chassis orchestration engine 204 can coordinate with the daemon 230a to check if the (battery backed) memory module 220 is in a memory save state and pause operation, or the wait times out. In some examples, in response to determining that the memory module 220 is in memory module is in a memory save state, the chassis orchestration engine 204 pauses power operations until the save operation completes (to avoid unsafe power conditions). In some examples, the memory module 220 includes a non-volatile dual in-line memory module (NVDIMM). In some examples, the daemon 230a includes a SLED daemon. Further, the chassis orchestration engine 204 coordinates with the daemon 230b to activate the PSU 222. In particular, the chassis orchestration engine 204 powers on the PSU 222. In some examples, daemon 230b is a POWER daemon. Moreover, the chassis orchestration engine 204 coordinates with the daemon 230d to active the network switch 226. In particular, the chassis orchestration engine 204 can coordinate with the daemon 230d to power on the network switch 226. Thus, in some examples, the sequence of events can include, in order, by the orchestration engine 204 i) coordinate with the daemon 230a to determine that the memory module 220 is active, ii) coordinate with the daemon 230b to activate the PSU 222, and iii) coordinate with the daemon 230d to activate the network switch 226. In some implementations, the chassis orchestration engine 204, after performing the sequence of actions, provides a signal to the components 208 indicating the active state of the enclosure controller 206a.

In some examples, the sequence of actions can include activating the cooling system 224. Specifically, the chassis orchestration engine 204 coordinates with the daemon 230c to activate the cooling system 224. In particular, the chassis orchestration engine 204 can coordinate with the daemon 230c to commence powering the cooling system 224, such as powering on fans that are required to cool the enclosure controllers 206. In some examples, the daemon 230c is a THERMAL daemon. In some examples, the sequence of actions can include, in order, by the orchestration engine 204 i) coordinate with the daemon 230a to determine that the memory module 220 is active, ii) coordinate with the daemon 230b to activate the PSU 222, iii) coordinate with the daemon 230c to activate the cooling system 224, and iv) coordinate with the daemon 230d to activate the network switch 226.

In some examples, the chassis orchestration engine 204 coordinates with the daemon 230a and/or daemon 230b to determine whether a condition is present that would prevent safe activation of the PSU 222. The chassis orchestration engine 204 can coordinate with the daemon 230b to activate the PSU 222. In particular, the chassis orchestration engine 204 powers on the PSU 222. Moreover, the chassis orchestration engine 204 coordinates with the daemon 230c to active the cooling system 224. Thus, in some examples, the sequence of events can include, in order, by the orchestration engine 204 i) coordinate with the daemon 230a and/or 230b to determine whether there is a condition present that would prevent safe activation of the PSU 222, ii) coordinate with the daemon 230b to activate the PSU 222, and iii) coordinate with the daemon 230c to activate the cooling system 224. In some implementations, the chassis orchestration engine 204, after performing the sequence of actions, provides a signal to the components 208 indicating the active state of the enclosure controller 206a.

In some examples, the sequence of actions can include the chassis orchestration engine 204 coordinating with the daemon 230d to activate the network switch 226. In particular, the chassis orchestration engine 204 can coordinate with the daemon 230d to power on the network switch 226. In some examples, the sequence of actions can include, in order, by the orchestration engine 204 i) coordinate with the daemon 230b to determine whether there is a condition present that would prevent safe activation of the PSU 222, ii) coordinate with the daemon 230b to activate the PSU 222, iii) coordinate with the daemon 230c to activate the cooling system 224, and iv) coordinate with the daemon 230d to activate the network switch 226.

In some implementations, the chassis orchestration engine 204, after placing the enclosure controller 206a in the active state, can conduct a power inventory of the components of the chassis system 202. Conducting the power inventory can include coordinating, by the chassis orchestration engine 204, with the daemons 230 for a complete hardware inventory of the chassis system 202 such that the daemons 230 report their power (wattage) usage. Specifically, the chassis orchestration engine 204 provides a signal to each of the daemons 230, and in response to the signal, receives a current power usage of the computing components associated with each of the daemons 230. The chassis orchestration engine 204 can then determine an aggregated power usage of the computing components of the chassis system 204, and determine that this aggregated power usage is less than the power that is to be supplied by the PSU 222. Thus, this prevents the chassis system 202 from drawings more power than the PSU 222 is capable of supplying. In some examples, the chassis orchestration engine 204, after determining that that power to be supplied by the PSU 222 is greater than the aggregated power usage of the chassis system 202, provides power to the computing components of the chassis system 202.

In some examples, after performing the power inventory, full chassis power operations can commence of the chassis system 202, such as powering the chassis system 202. This can include determining, by the chassis orchestration engine 202, whether infrastructure of the chassis system 202 needs to be powered on, and then providing power to input/output modules (IOMs) and/or computing SLEDs of the chassis system 202.

In some examples, the chassis orchestration engine 204 can be based on a state machine that encompasses all of the startup and shut down tasks associated with the chassis system 202. Specifically, the chassis orchestration machine 204 facilitates comprehensive error handling for each stage of the state machine, such that all possible errors that might arise due to a failure of a state transition can be handled by the chassis orchestrion engine 204, including timeout waiting for an expected replay, retries for failure conditions, unexpected replies arriving out of order, and/or error response from the daemons 230. Additionally, the chassis orchestration engine 204 is able to add new states (to handle changing or new hardware requirements), for example, sequencing to handle additional memory models.

In some examples, to handle errors (e.g., during coordination of remote procedure calls), the chassis orchestration engine 204 can encode timeouts for each state in a state table of the chassis orchestration engine 204, and define error recovery states to transition to for common, known error conditions and generic error paths for any unknown error returns.

In some implementations, the chassis orchestration engine 204 can, in response to identifying the power event, negotiate between the enclosure controllers 206 to place the enclosure controller 206b in the inactive state. In short, the enclosure controller 206b, as the standby enclosure controller, can take over operations of the enclosure controller 206a in case of hardware or software failure of the active enclosure controller 206a. Each of the enclosure controllers 206 are separately installable field-replaceable units (FRUs), with the chassis system 202 only operable when each of the enclosure controllers 206 include identical firmware versions. Thus, the chassis orchestration engine 204 conducts initial communication between each of the enclosure controllers 206 and performs version comparison to ensure that the two FRUs including identical firmware versions. The standby enclosure controller 206b is held in a standby state until the active enclosure controller 206a releases the standby enclosure controller 206b. The chassis orchestration engine 204 facilitates such release.

Figure 3:
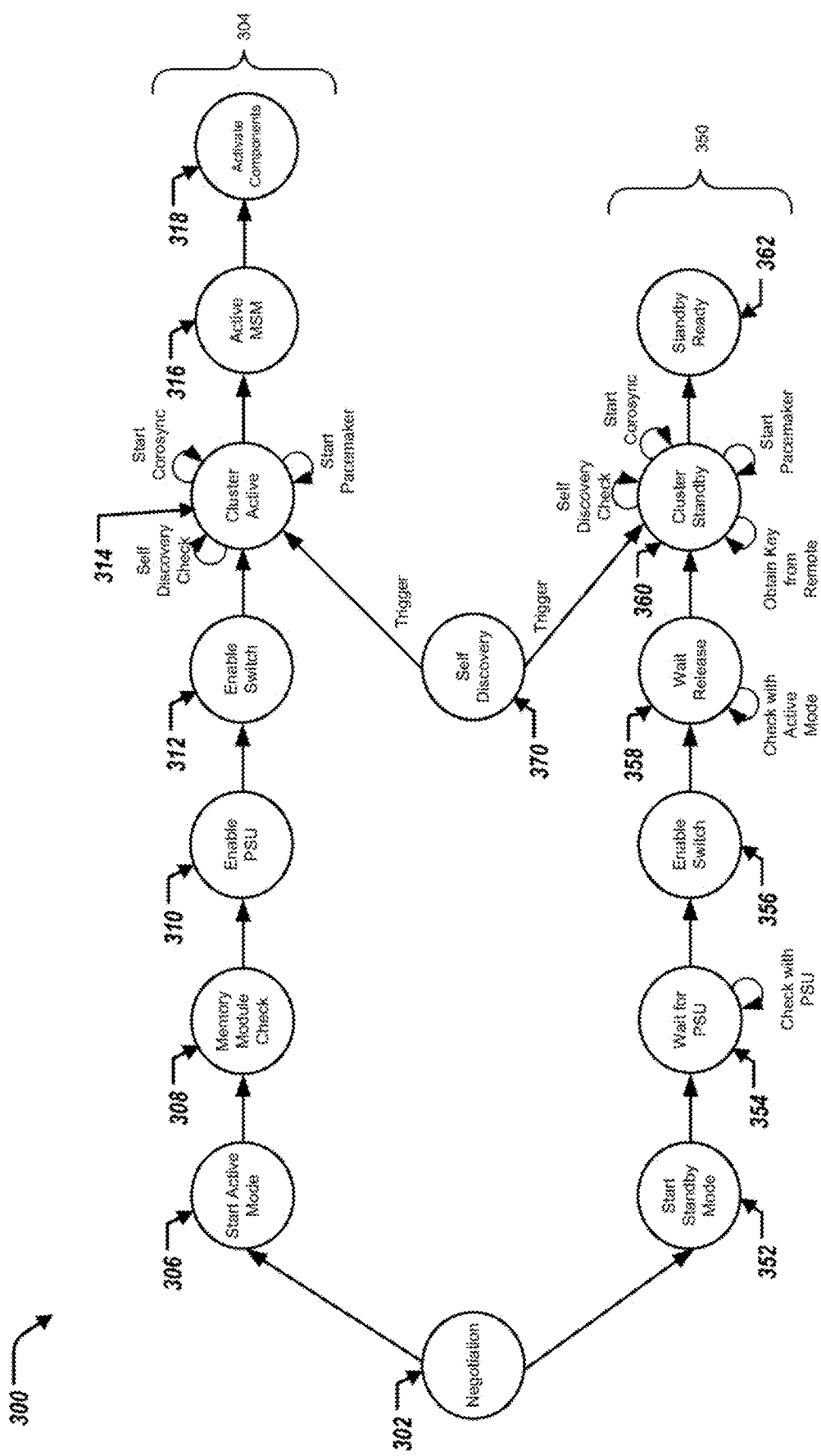
FIG. 3 illustrates a state diagram that can be employed by the chassis orchestration engine.

FIG. 3 illustrates a state diagram 300 that can be employed by the chassis orchestration engine 204. Specifically, at a negotiation state 302, the chassis orchestration engine 204 identifies the enclosure controller 206a as the active controller, and the enclosure controller 206b as the inactive controller. The active path 304 proceeds to the start active mode state 306, and if successful, proceeds to the action 308 of memory module check (e.g., memory module 220). If the check of the memory module is successful at 308 (e.g., the memory module 220 is active), the active path 304 proceeds to the action 310 of enable PSU (e.g., the PSU 222). If the enablement of the PSU is successful at 310, the active path 304 proceeds to the action 312 of enabling network switch (e.g., the switch 226). If the enablement of the network switch is successful at 312, the active path 304 proceeds to a state 314 of the cluster (e.g., the system chassis 202 or any computing module(s) of the system chassis 202) being active. The active path 304 can proceed to action 316 to activate the MSM, and then to action 318 to provide power to the remaining components (e.g., components 308).

Furthermore, after identifying the enclosure controller 206b as the inactive controller at the negotiation state 302, the standby (or inactive) path 350 proceeds to the start standby state 352, and if successful, proceeds to the action 354 of waiting until the PSU is active (e.g., the PSU 222). Once the PSU is active, the standby path 350 proceeds to the action 356 of enabling a network switch, and if successful, proceeds to a state 358 of waiting for release. If the enclosure controller 206b is released (e.g., by the enclosure controller 206a), the inactive path 350 proceeds to a state 360 of cluster standby. The inactive path 350 can then proceed to an action 362 of the enclosure controller 206b being standby ready.

Additionally, at states 314 and/or 358, the respective states can activate clustering subsystems (e.g., Corosync and/or Pacemaker). Specifically, the clustering subsystems can facilitate active and standby status of the enclosure controllers 206. Further, at states 314 and/or 358, the respective states can perform self-discovery checks. Additionally, a state 370 can include a self-discovery of the components of the chassis system 202, and trigger cluster at either of states 314, 358.

Figure 4:
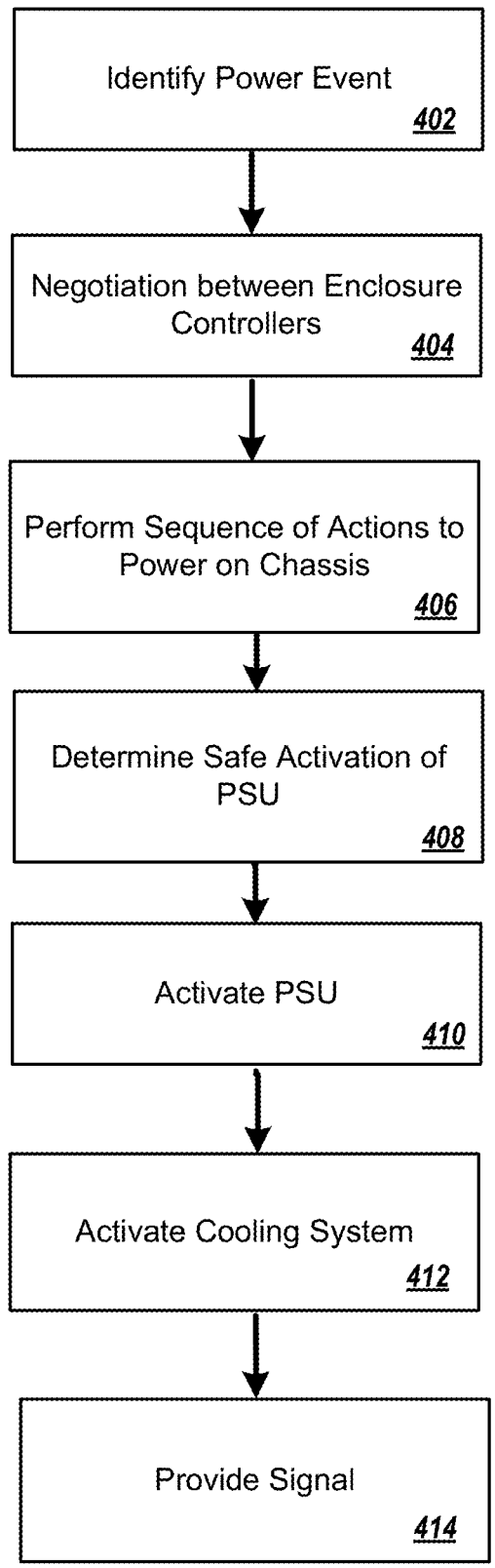
FIG. 4 illustrates a flowchart for a power startup orchestration performed by the chassis orchestration engine.

FIG. 4 illustrates a flowchart depicting selected elements of an embodiment of a method 400 for a power startup orchestration performed by the chassis orchestration engine. The method 400 may be performed by the information handling system 100 and/or the chassis orchestration engine 204 described herein with reference to FIGS. 1 and 2, or another information handling system. It is noted that certain operations described in method 400 may be optional or may be rearranged in different embodiments.

The chassis orchestration engine 204 identifies a power event of the chassis system 202 (402). In some examples, the power event can include an initial booting of the chassis system 202. In some examples the power event can include a restart booting of the chassis system 202. The chassis orchestration engine 204 can, in response to identifying the power event, negotiates between the enclosure controllers 206 to place the enclosure controller 206a in an active state (404). In some examples, the chassis orchestration engine 204 can be included by each of the enclosure controllers 206. In response to placing the enclosure controller 206a in the active state, the chassis orchestration engine 204 performs the sequence of actions to enable powering on of the chassis system 202 (406). Specifically, the chassis orchestration engine 204 coordinates with the daemon 230a and/or 230b to determine whether any condition is present that would prevent safe activation of the PUS 222 (408). The chassis orchestration engine 204 coordinates with the daemon 230b to activate the PSU 222 (410). The chassis orchestration engine 204 coordinates with the daemon 230c to active the cooling system 224 (412). The chassis orchestration engine 204, after performing the sequence of actions, provides a signal to the components 208 indicating the active state of the enclosure controller 206a (414).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
identifying a power event of a chassis system that includes a plurality of components;
in response to identifying the power event, negotiating between a first and a second enclosure controller (EC) to place the one of the ECs in an active state, wherein the first and the second EC are redundant;
in response to placing one of the ECs in the active state, performing, by a chassis orchestration engine, a sequence of actions, including:
determining, by coordinating with a first daemon, whether a condition is present that would prevent safe activation of a power supply unit,
activating, by coordinating with a second daemon, the power supply unit of the chassis system,
activating, by coordinating with a third daemon, a cooling system of the chassis system; and
after performing the sequence of actions, providing a signal to the one or more of the components indicating the active state of the first EC.

2. The computer-implemented method of claim 1, wherein the sequence of actions further includes activating, by coordinating with an additional daemon, a network switch.

3. The computer-implemented method of claim 2, wherein the first daemon is a SLED daemon, the second daemon is a POWER daemon, and the third daemon is a THERMAL daemon.

4. The computer-implemented method of claim 1, further comprising:
determining, by the chassis orchestration engine, that there are battery backed memory modules present that are currently in-progress with a memory save operation; and
in response to determining that a memory save operation is in progress, pausing chassis power operations until the save operation completes to avoid unsafe power conditions.

5. The computer-implemented method of claim 1, further comprising:
after placing one of the ECs in the active state, providing power to the one or more components, including providing power to the chassis system, input/output modules (IOMs), and SLEDs.

6. The computer-implemented method of claim 1, further comprising conducting a power inventory of the one or more components of the chassis system.

7. The computer-implemented method of claim 1, wherein the power event is a cold boot or a warm boot.

8. The computer-implemented method of claim 6, wherein conducting the power inventory further comprises:
after placing one of the ECs in the active state, providing a signal to each of a plurality of daemons each associated with one of the one or more computing components;
receiving, in response to the signal and from each daemon, a current power usage associated with the respective computing component; and
determining that power to be supplied by one or more power supply units of the chassis system is greater than an aggregated current power usage of the computing components.

9. The computer-implemented method of claim 8, further comprising:
after determining that the power to be supplied by the one or more power supply units of the chassis system is greater than the aggregated current power usage of the computing components, providing power to the one or more computing components.

10. The computer-implemented method of claim 1, wherein identifying the power event of the chassis system is in response to a detected fail over process.

11. The computer-implemented method of claim 1, further includes activating a clustering software component on the active EC to manage a failure recovery when failure occurs in the active EC.

12. The computer-implemented method of claim 11, in response to the failure recovery, negotiating between the first and the second EC to place the other EC in a standby state, including releasing the other EC to join the active EC cluster only when each of the first and second ECs include identical firmware versions.

13. A system comprising a processor having access to memory media storing instructions executable by the processor to:
identifying a power event of a chassis system that includes a plurality of components;
in response to identifying the power event, negotiating between a first and a second enclosure controller (EC) to place the one of the ECs in an active state, wherein the first and the second EC are redundant;
in response to placing one of the ECs in the active state, performing, by a chassis orchestration engine, a sequence of actions, including:
determining, by coordinating with a first daemon, whether a condition is present that would prevent safe activation of a power supply unit,
activating, by coordinating with a second daemon, the power supply unit of the chassis system,
activating, by coordinating with a third daemon, a cooling system of the chassis system; and
after performing the sequence of actions, providing a signal to the one or more of the components indicating the active state of the first EC.

14. The system of claim 13, wherein the sequence of actions further includes activating, by coordinating with an additional daemon, a network switch.

15. The system of claim 14, wherein the first daemon is a SLED daemon, the second daemon is a POWER daemon, and the third daemon is a THERMAL daemon.

16. The system of claim 13, the operations further comprising:
determining, by the chassis orchestration engine, that there are battery backed memory modules present that are currently in-progress with a memory save operation; and
in response to determining that a memory save operation is in progress, pausing chassis power operations until the save operation completes to avoid unsafe power conditions.

17. The system of claim 13, the operations further comprising:

after placing one of the ECs in the active state, providing power to the one or more components, including providing power to the chassis system, input/output modules (IOMs), and SLEDs.

18. The system of claim 13, the operations further comprising conducting a power inventory of the one or more components of the chassis system.

19. The system of claim 13, wherein the power event is a cold boot or a warm boot.

20. A non-transitory computer-readable medium storing software comprising instructions executable by one or more computers which, upon such execution, cause the one or more computers to perform operations comprising:
  identifying a power event of a chassis system that includes a plurality of components;
  in response to identifying the power event, negotiating between a first and a second enclosure controller (EC) to place the one of the ECs in an active state, wherein the first and the second EC are redundant;
  in response to placing one of the ECs in the active state, performing, by a chassis orchestration engine, a sequence of actions, including:
    determining, by coordinating with a first daemon, whether a condition is present that would prevent safe activation of a power supply unit,
    activating, by coordinating with a second daemon, the power supply unit of the chassis system,
    activating, by coordinating with a third daemon, a cooling system of the chassis system; and
  after performing the sequence of actions, providing a signal to the one or more of the components indicating the active state of the first EC.

\* \* \* \* \*